United States Patent [19]

Schmerling

[11] 3,760,022

[45] Sept. 18, 1973

[54] ALKYLATION OF AROMATIC HYDROCARBONS

[75] Inventor: Louis Schmerling, Riverside, Ill.

[73] Assignee: Universal Oil Products Company, Des Plaines, Ill.

[22] Filed: Nov. 8, 1971

[21] Appl. No.: 196,794

[52] U.S. Cl. .......................... 260/671 R, 260/671 C
[51] Int. Cl. ............................................... C07c 3/56
[58] Field of Search ...................... 260/671 P, 671 R

[56] References Cited
UNITED STATES PATENTS 2,759,030　8/1956　Schmerling..................... 260/671 P
2,088,598　8/1937　Ipatieff et al..................... 260/671 P
2,737,536　3/1956　Bloch et al....................... 260/671 R Primary Examiner—Curtis R. Davis
Attorney—James R. Hoatson, Jr.

[57] ABSTRACT

Aromatic hydrocarbons are alkylated with saturated hydrocarbons by treating the mixture of reactants with an alkyl halide in the presence of a Friedel-Crafts catalyst.

10 Claims, No Drawings

ALKYLATION OF AROMATIC HYDROCARBONS

This invention relates to a process for the alkylation of organic compounds, and particularly to a process for the alkylation of aromatic hydrocarbons utilizing saturated hydrocarbons, as the alkylating agent. More specifically, the invention is concerned with the alkylation of aromatic hydrocarbons by treating the aromatic hydrocarbon and the alkylating agent with an alkyl halide in the presence of certain catalytic compositions of matter.

It is known in the art that organic compounds, and particularly aromatic hydrocarbons, may be alkylated with alkylating agents such as olefinic hydrocarbons, alkyl halides, etc. The thus formed alkylated aromatic hydrocarbons are useful compounds in the chemical field, said alkylated aromatic hydrocarbons being used as intermediates in the preparation of pharmaceuticals, synthesis of dyes, in resin manufacture, as a plasticizer for some synthetic resins, or as intermediates in the preparation of synthetic detergents.

It is therefore an object of this invention to provide a process for the alkylation of aromatic hydrocarbons.

Another object of this invention is to provide a process for alkylating aromatic hydrocarbons utilizing saturated hydrocarbons as the alkylating agent.

In one aspect an embodiment of this invention resides in a process for the alkylation of an aromatic hydrocarbon which comprises reacting an aromatic hydrocarbon with a saturated hydrocarbon containing at least one tertiary carbon atom, or which is isomerized to form a hydrocarbon containing a tertiary carbon atom during the reaction, at alkylation conditions in the presence of a Friedel-Crafts catalyst and an alkyl halide, and recovering the resultant alkylated aromatic hydrocarbon.

A specific embodiment of this invention is found in a process for the alkylation of aromatic hydrocarbons which comprises reacting benzene with 3-methylhexane at a temperature in the range of from about 0° to about 250°C. and at a pressure in the range of from atmospheric to about 100 atmospheres in the presence of aluminum chloride and t-butyl chloride, and recovering the resultant isoheptylbenzene.

Other objects and embodiments will be found in the following further detailed description of this invention.

As hereinbefore set forth, the present invention is concerned with a process for the alkylation of organic compounds, and particularly aromatic hydrocarbons, using saturated hydrocarbons as the alkylating agent. The reaction is effected in the presence of an alkyl halide, and particularly a t-alkyl halide utilizing a Friedel-Crafts metal halide as the alkylation catalyst. The obtention of the alkylated aromatic hydrocarbon in which the alkyl substituent is the saturated hydrocarbon is unexpected inasmuch as it has been known that t-alkyl halides and particularly t-alkyl chlorides react rapidly with aromatic hydrocarbons in the presence of a Friedel-Crafts catalyst such as aluminum chloride.

Suitable saturated hydrocarbons which may be used in the process of this invention include those hydrocarbons containing a tertiary carbon atom or those which may undergo isomerization under the reaction conditions of the present process to form a hydrocarbon containing a tertiary carbon atom. These saturated hydrocarbons will include paraffins and cycloparaffins, the paraffins including isobutane, isopentane, 2-methylpentane, 3-methylpentane, 2,3-dimethylbutane, 2,3-dimethylpentane, 2-methylhexane, 3-methylhexane, 2,3-dimethylhexane, etc.; cycloparaffins include methylcyclopentane, methylcyclohexane, methylcycloheptane, ethylcyclopentane, propylcyclopentane, ethylcyclohexane, propylcyclohexane, 1,2-dimethylcyclopentane, 1,3-dimethylcyclopentane, 1,2-diethylcyclopentane, 1,2-dimethylcyclohexane, 1,2-diethylcyclohexane, etc. decahydronaphthalene, alkyl substituted decahydronaphthalenes such as 1-methyldecahydronaphthalene, 2-methyldecahydronaphthalene, 1,2-dimethyldecahydronaphthalene, etc. In addition such hydrocarbons as n-butane, n-pentane and cyclohexane which may, under the operating conditions of the present process, isomerize to form isobutane, isopentane and methylcyclopentane, respectively, may also be used.

Aromatic hydrocarbons which may be alkylated by the aforementioned saturated hydrocarbons containing a tertiary carbon atom according to the process of this invention are those which are designated as alkylatable aromatic hydrocarbons and contain a replaceable hydrogen atom. Examples of aromatic hydrocarbons falling within this definition include benzene, toluene, o-, m- and p-xylene, 1,2,3-trimethylbenzene, 1,2,4-trimethylbenzene, 1,3,5-trimethylbenzene, etc., ethylbenzene, propylbenzene, isopropylbenzene, the butylbenzenes, etc., 1,2-diethylbenzene, 1,2,3-triethylbenzene, 1,2,4-triethylbenzene, 1,2-dipropylbenzene, 1,3-dipropylbenzene, 1,4-dipropylbenzene, 1,2,3-tripropylbenzene, 1,2,4-tripropylbenzene, 1,4-di-isopropylbenzene, p-cymene, etc.; polycyclic aromatic compounds including naphthalene, 1-methylnaphthalene, 2-methylnaphthalene, 1-ethylnaphthalene, 2-ethylnaphthalene, 1-propylnaphthalene, 2-propylnaphthalene, etc., 1,4-dimethylnaphthalene, 1,2-diethylnaphthalene, 1,5-dipropylnaphthalene, etc., 1,2,3-trimethylnaphthalene, 1,2,4-trimethylnaphthalene, 1,2,3-triethylnaphthalene, etc., 1,2,3,4-tetrahydronaphthalene, indene, indan, etc., biphenyl, terphenyl, etc., anthracene, 1-methylanthracene, 2-methylanthracene, 1-ethylanthracene, 2-ethylanthracene, 9,10-dimethylanthracene, 1,2-dimethylanthracene, 1,2-diethylanthracene, etc., 9,10-dipropylanthracene, etc., phenanthrene, 1-methylphenanthrene, 2-methylphenanthrene, 1-ethylphenanthrene, 2-ethylphenanthrene, etc., 1,2-dimethylphenanthrene, 1,3-dimethylphenanthrene, 1,2-diethylphenanthrene, etc., chrysene, 1-methylchrysene, 2-methylchrysene, 1-ethylchrysene, 2-ethylchrysene, 1,2-dimethylchrysene, 1,2-diethylchrysene, 1,3-dimethylchrysene, 1,3-diethylchrysene, etc., pyrene, 1-methylpyrene, 2-methylpyrene, 1-ethylpyrene, 2-ethylpyrene, etc., 1,2-diethylpyrene, 1,3-dimethylpyrene, 1,3-diethylpyrene, etc. It is to be understood that all of the aromatic hydrocarbons do not necessarily give equivalent products. It is to be further understood that the above mentioned alkylatable aromatic hydrocarbons are set forth only as examples of the compounds which may be used in this process and that any aromatic compounds containing a replaceable hydrogen atom which will undergo alkylation with an alkylating agent under the conditions of this invention may be used in the process of the present invention. This will include other substituted aromatic compounds other than those enumerated above such as the phenols, anilines, and halogen-substituted aromatics such as chlorobenzene, bromobenzene, dichlorobenzene, dibromobenzene, chloronaphthalene, bromonaphthalene, dichloronaphthalene, dibromonaphthalene, etc., and the like.

The catalysts which are utilized in the process of this invention will comprise the Friedel-Crafts type catalyst including aluminum chloride, aluminum bromide, zirconium chloride, and boron fluoride as the preferred metal halides. Although boron is a metalloid, for purposes of this invention it is to be classified as a metal. It is also contemplated within the scope of this invention that other metallic halides of this class such as ferric chloride and zinc chloride, as well as protonic acid catalysts such as hydrogen fluoride, may be used, although not necessarily with equivalent results. Alkyl halides which are used to treat the aromatic hydrocarbons and alkylating agent in the presence of the Friedel-Crafts catalyst will include, in particular, the tertiary alkyl chlorides and bromides such as t-butyl chloride, t-butyl bromide, 2-chloro-2-methylbutane, 2-bromo-2-methylbutane, 2-chloro-2-methylpentane, 2-bromo-2-methylpentane, 3-chloro-3-methylpentane, 3-bromo-3-methylpentane, 2-chloro-2-methylhexane, 2-bromo-2-methylhexane, 3-chloro-3-methylhexane, 3-bromo-3-methylhexane, etc. In addition to the aforementioned tertiary alkyl chlorides and bromides, it is also possible to utilize primary and secondary alkyl halides such as n-propyl chloride, n-propyl bromide, isopropyl chloride, isopropyl bromide, n-butyl chloride, n-butyl bromide, sec-pentyl chloride, sec-pentyl bromide, 1-chloro-3,3-dimethylbutane, etc., although not necessarily with equivalent results.

The reaction conditions under which the process of the present invention will depend largely upon are the particular reactants and the catalyst which is utilized. Generally speaking, temperatures ranging from about 0° to about 250°C. may be employed, the preferred range, especially when aluminum chloride, as a more active Friedel-Crafts catalyst, is used to catalyze the reaction in the range of from about 0° to about 80°C. Use of other Friedel-Crafts catalysts which are less active than the aforementioned chloride will result in the reaction being effected at temperatures greater than 80°C., that is, from about 100° to about 150°C. In addition it is also contemplated that the reaction may be effected at a pressure in a range from atmospheric up to about 100 atmospheres or more, the superatmospheric pressures being afforded by the introduction of a substantially inert gas such as nitrogen into the reaction zone, the amount of superatmospheric pressure which is employed being that which is sufficient to maintain a large portion of the reactants in a liquid phase.

The process of the present invention may be effected in any suitable manner and may comprise either a batch or continuous type operation. When a batch type operation is used, the alkyl halide, and, if desired, part of the paraffin and the aromatic hydrocarbon are gradually added to a stirred mixture of the aromatic hydrocarbon, the paraffin and the catalyst in a reaction vessel provided with stirring means. The vessel is then maintained at room temperature, heated or cooled to the desired temperature depending upon the reactants and the catalyst used in the process. After a predetermined reaction time has elapsed, which may range from about 0.5 to about 10 hours or more in duration after the alkyl halide is added, the vessel and contents thereof are allowed to return to room temperature, if at a temperature different from that of ambient, the desired reaction product is separated from the catalyst layer and recovered from any unreacted starting material by conventional means which will include, for example, washing, drying, extraction, fractional distillation, etc.

It is also contemplated within the scope of this invention that the operation of the present process may be effected in a continuous manner of operation. A particularly suitable type of continuous process comprises a fixed bed reaction zone, containing the catalyst, said zone being maintained at the proper and suitable conditions as temperature and pressure. The aromatic compound, the alkylating agent, and the alkyl halide, are charged to the reactor through separate means or, if so desired, one reactant may be admixed with another and the mixture charged thereto in a single stream. The streams of reactants are passed through the catalyst bed in either an upward or downward flow for a predetermined period of time after which the reactor effluent will be continuously withdrawn from the reaction zone and subjected to conventional means of separation hereinbefore set forth in greater detail whereby the desired alkylated aromatic hydrocarbon may be recovered, while any unreacted starting materials may be recycled to the reaction zone to form a portion of the feed stock. Another method of continuous type operation is the moving bed type in which the catalyst (with or without one or both hydrocarbons) and the reactants are passed in separate streams through the reaction zone either concurrently or countercurrently to each other. Alternatively, the slurry type of operation may also be employed wherein the catalyst is carried into the reaction zone as a slurry in one or both of the hydrocarbon reactants. In the latter two types of operation, the reactor effluent is treated in a similar manner whereby unreacted alkylating agent, aromatic hydrocarbons, and alkyl halides are removed or separated from the alkylated aromatic hydrocarbons and recycled to form a portion of the feed stock as shown in the following examples.

EXAMPLE I

In this example, a mixture of 80 g. of benzene, 50 g. of 3-methylhexane, and 15 g. of aluminum chloride were placed in a glass alkylation flask provided with stirring means. The mixture was continuously stirred while a mixture of 48 g. of t-butyl chloride and 62 g. of 3-methylhexane were slowly added dropwise in four incremental portions to the stirred mixture. The temperature during the reaction time of two hours ranged from 24° to 27°C. After each addition of t-butyl chloride, which took from 15 to 30 minutes each, stirring was stopped and a sample of the supernatant liquid was removed and analyzed by means of a gas-liquid chromatograph. The analysis of the first alkylation product revealed that the chief reaction product comprised heptylbenzene, with little or no t-butylbenzene being present. The gas-liquid chromatographic analysis of the sample from the second period contained a major portion of branched chain heptylbenzenes and a smaller amount of t-butylbenzene. Upon completion of the two-hour period, it was determined by analysis that a major portion of the alkylated aromatic product comprised heptylbenzenes. Addition of the third and fourth incremental proportions of t-butyl chloride gave proportionately more t-butylbenzene, presumably because the relative amount of 3-methylhexane decreased as the reaction progressed.

EXAMPLE II

A mixture of 80 grams of benzene, 16 grams of aluminum chloride and 74 grams of isopentane was placed in a glass alkylation flask provided with stirring means. The solution was stirred while a mixture of 42 grams of 1-chloro-3,3-dimethylbutane and 19 grams of isopentane was added dropwise to the stirred mixture. The temperature was maintained at 25°C. for a total reaction period of 1.3 hours. At the end of this period, a gas-liquid chromatographic analysis of the reaction product disclosed the presence of a mixture of pentylbenzenes (40 mol % yield) which consisted of about 25 percent neopentylbenzene, 55 percent secisopentylbenzene and 20 percent t-pentylbenzene. Hexylbenzene was produced in only 6 mol % yield.

EXAMPLE III

A mixture of 81 g. of benzene, 84 g. of methylcyclopentane and 15 g. of aluminum chloride was placed in a glass alkylation flask. The mixture was stirred while a solution of 42 g. of methylcyclopentane and 62 g. of benzyl chloride was slowly added dropwise to the stirred mixture of benzene, methylcyclopentane and aluminum chloride. The temperature of the stirred mixture was maintained in a range of from 27° to 30°C. for a period of 3.5 hours. Analysis of the reaction mixture by means of a gas-liquid chromatograph disclosed the formation of a mixture of methylcyclopentylbenzenes as the major product.

EXAMPLE IV

In this example a mixture of 92 g. of toluene, 36 g. of isopentane and 15 g. of zirconium chloride is placed in a glass alkylation flask. The mixture is continuously stirred at room temperature while 50 g. of isopentane and 48 g. of t-butyl chloride is slowly added dropwise to the stirred mixture of the toluene, isopentane and zirconium chloride. After continuously stirring the mixture for a total reaction time of two hours, the reaction product is subjected to gas-liquid chromatographic analysis which will disclose the presence of a mixture of pentyltoluenes, the major portion being m-(1,2-dimethylpropyl) toluene.

EXAMPLE V

To a stirred mixture of 92 g. of toluene, 50 g. of 2,3-dimethylbutane and 15 g. of aluminum chloride is slowly added dropwise a mixture of 62 g. of 2,3-dimethylbutane and 48 g. of t-butyl chloride. After completion of the addition, the mixture is stirred for an additional 30 minutes following which the reaction product is recovered. A gas-liquid chromatographic analysis of the reaction product will determine the presence of a mixture of hexyltoluenes, the major portion of said mixture comprising the m-(1,2,2-trimethylpropyl)toluene isomer.

I claim as my invention:

1. A process for the alkylation of an aromatic hydrocarbon which comprises reacting an aromatic hydrocarbon with a saturated hydrocarbon containing at least one tertiary carbon atom, or which is isomerized to form a hydrocarbon containing a tertiary carbon atom during the reaction, at alkylation conditions in the presence of a Friedel-Crafts catalyst and an alkyl halide, and recovering the resultant alkylated aromatic hydrocarbon.

2. The process as set forth in claim 1 in which said alkylation conditions include a temperature in the range of from about 0° to about 250°C. and a pressure in the range of from atmospheric to about 100 atmospheres.

3. The process as set forth in claim 1 in which said Friedel-Crafts catalyst is aluminum chloride.

4. The process as set forth in claim 1 in which said Friedel-Crafts catalyst is zirconium chloride.

5. The process as set forth in claim 1 in which said alkyl halide is t-butyl chloride or benzyl chloride.

6. The process as set forth in claim 1 in which said aromatic hydrocarbon is benzene, said saturated hydrocarbon is isopentane and said alkylated hydrocarbon is t-pentylbenzene and sec-isopentylbenzene.

7. The process as set forth in claim 1 in which said aromatic hydrocarbon is benzene, said saturated hydrocarbon is 3-methylhexane, and said alkylated hydrocarbon is branched-chain heptylbenzenes.

8. The process as set forth in claim 1 in which said aromatic hydrocarbon is toluene, said saturated hydrocarbon is isopentane, and said alkylated hydrocarbon is a mixture of pentyltoluenes.

9. The process as set forth in claim 1 in which said aromatic hydrocarbon is benzene, said saturated hydrocarbon is methylcyclopentane, and said alkylated hydrocarbon is a mixture of methylcyclopentylbenzenes.

10. The process as set forth in claim 1 in which said aromatic hydrocarbon is toluene, said saturated hydrocarbon is 2,3-dimethylbutane, and said alkylated hydrocarbon is a mixture of hexyltoluenes.

* * * * *